(No Model.)

C. C. GRENZEBACH.
AUTOMATIC FLY TRAP.

No. 599,501. Patented Feb. 22, 1898.

Witnesses
John Laylin
A. B. Bowen

Inventor
Chas. C. Grenzebach
per S. E. Bauder
Attorney

UNITED STATES PATENT OFFICE.

CHARLES C. GRENZEBACH, OF BIRMINGHAM, OHIO.

AUTOMATIC FLY-TRAP.

SPECIFICATION forming part of Letters Patent No. 599,501, dated February 22, 1898.

Application filed May 5, 1897. Serial No. 635,161. (No model.)

*To all whom it may concern:*

Be it known that I, CHARLES C. GRENZEBACH, a citizen of the United States, residing at Birmingham, in the county of Erie and State of Ohio, have invented certain new and useful Improvements in Automatic Fly-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in automatically-operating fly-traps; and it consists in a spring-actuated mechanism, a weighted lever operated thereby, and a vertically-moving shield which incloses four sides of the frame, combined with a frame which is divided into two compartments or stories by means of horizontal partitions, and on which partitions suitable substances are placed to attract the flies, suitable tubes leading from these compartments through which the flies escape, and a suitable receptacle placed upon the top of the framework to catch the flies as they emerge from the tubes, all of which will be more fully described hereinafter.

The objects of my invention are to provide a fly-trap in which an inclosing shield moves vertically upon the frame at predetermined times and which alternately incloses first one compartment of the frame and then the other, so as to catch the flies which have gathered therein while the compartment was open, and to provide a mechanism for automatically catching flies which will need no attention or care on the part of an operator after the spring has once been wound and suitable bait placed in the bait-compartments.

Figure 1:
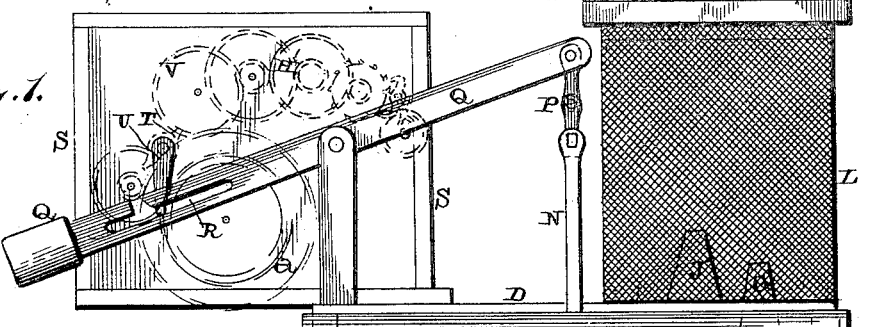
Figure 2:
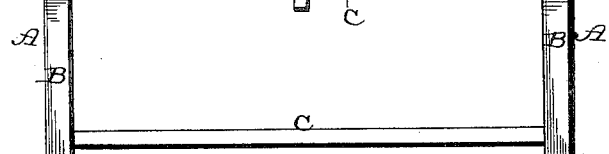
Figure 3:
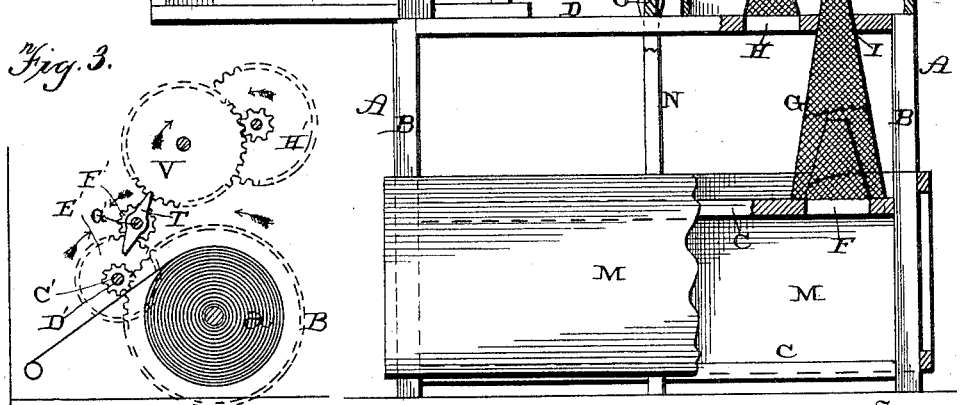

In the accompanying drawings, Figures 1 and 2 represent side elevations of a fly-trap embodying my invention, the shield being shown in two different positions. Fig. 3 is a detail view showing a portion of the operating mechanism.

A represents a rectangular frame, which consists simply of the four posts B, the two floors or partitions C, and the top D. Through the central partition is made an opening F, through which the flies escape upward through wire-gauze tubes G when the lower compartment is closed, and through the top D are made two openings H I. The one, H, corresponds to the opening F, and through which and the wire-gauze J, placed just above it, the flies escape into the receiver L, placed upon the top of the frame. A hole is made through the top to allow the upper end of the tube G to pass through the top into the receiver L, so that the flies in emerging from the tube G will pass directly into the receiver, which is loosely placed upon the top D, and which is removed whenever necessity requires that the captive flies shall be destroyed or removed.

Suitable bait in the shape of sugar, meat, or other material is placed upon each of the floors or partitions C, and the framework is open upon all four sides, so that the flies will freely enter and settle upon the bait. Inclosing all four sides of the frame is a vertically-moving shield M, which is slightly wider than one of the compartments and which is connected by vertical rods N, the horizontal cross-piece O, which extends across the top of the frame, and suitable connecting-links P, fastened to the weighted lever Q, which is provided with a slot R near one end.

Placed in an inclosing case S, which is secured to the top of the frame, is a clock-spring $a$, the power of which is expended in driving, through a suitable train of wheels and shafts, a double-ended revolving lever T, secured to the same shaft as the crank U, and which lever has its ends to alternately engage with the large wheel V, which in turn meshes with a train of gearing placed upon its opposite side from the gearing connected with the spring, and which train of gearing is provided with an escapement, a pendulum, or a regulator of any kind for regulating the speed at which the gearing shall operate. The spring itself is connected to the large toothed wheel B, which meshes with a pinion C', secured to the shaft D', and to which shaft is secured the larger toothed wheel E', which meshes with and causes the pinion F', secured to the shaft G', to revolve, and to this shaft G' the lever T is secured. During a portion of the revolution of the wheel F', which is constantly revolving, one end of the lever T engages with the teeth of the wheel V, and as the lever is revolved by the pinion F' this lever moves the entire line of wheels H', which extends beyond the wheel V and terminates in an escapement, a pendulum, or other suitable regulator. When one end of the lever T is in engagement with and moves the wheel V and the line of wheels H' connected therewith, the wheels V and H' remain at rest until the other point of the revolving lever sweeps around and again engages with the wheel V. I prefer to so time the double-pointed revolving lever that it shall make a half-revolution in a little more than two minutes, and thus move the weighted lever Q alternately from the position shown in one figure of the drawings to that shown in the other, and in thus raising and lowering the shield M first to catch the flies that have settled in one compartment and then catch those in the other. Each time that the crank U makes a half-revolution the shield M is either raised or lowered and is thus made to suddenly move over that compartment in the frame A which was open and in which the flies had settled upon the bait. As soon as the shield incloses one of the compartments all light is shut out therefrom except what passes through the openings F, H, and I, and the flies passing through these openings pass through the tubes G and J into the receiver L above, from which there is no escape.

I have here shown two trains of wheels, which are connected and made to operate together by means of a double-ended revolving lever; but I do not limit my invention to the special mechanism here shown for operating the shield M, for this may be varied at will without departing from the spirit of my invention. My object is to produce an automatically-acting mechanism which will raise and lower the shield between every two and three minutes, and thus make it inclose first one compartment and then the other, as has already been described.

Having thus described my invention, I claim—

1. In a fly-catcher, a frame, provided with more than one compartment, and a shield which is made to alternately inclose first one compartment and then the other, combined with a mechanism for automatically moving the shield in relation to the compartments, substantially as described.

2. In a fly-catcher, a frame, provided with a compartment in which the flies are to be caught, a movable shield which alternately incloses and opens the compartment, and a tube or pipe leading therefrom, combined with a mechanism for moving the shield, and a receiver placed over the end of said tube or pipe through which the flies pass from the compartment, substantially as set forth.

3. In a fly-catcher, a frame which is open upon all four sides, and which frame is provided with a central partition which divides the frame into two compartments, suitable tubes leading from the openings made through the top of the compartments, and through which the flies escape, and a receiver placed over the outer ends of the tubes to catch the flies, combined with a vertically-moving shield, and a mechanism for causing the shield to reciprocate so as to first inclose one compartment and then the other, substantially as specified.

4. In a fly-catcher, a frame that is open upon all four sides, and which is provided with a central partition, provided with an opening F therethrough, suitable tubes extending from the openings through the top of both of the compartments, and a receiver placed over the outer end of both of the tubes, combined with a vertically-reciprocating shield which is made to first inclose one compartment and then the other, combined with a weighted lever, and an automatically-operating mechanism for moving the lever, substantially as shown.

5. In a fly-catcher, a spring-actuated mechanism, a shaft operated thereby, and provided with a double-pointed lever, and a second mechanism which is operated by said lever, a crank placed upon the same shaft as the double-pointed lever, and a weighted lever that is operated by the crank, combined with an open frame, and a reciprocating shield which is moved back and forth over the frame so as to alternately inclose and open the compartment into which the flies are caught, substantially as described.

In testimony whereof I affix my signature in presence of two witnesses.

CHARLES C. GRENZEBACH.

Witnesses:
CHARLES SUBRO,
CHAS. E. BLOOMER.